(12) United States Patent
Callahan

(10) Patent No.: US 12,279,562 B2
(45) Date of Patent: *Apr. 22, 2025

(54) SHADE DEVICE

(71) Applicant: Michelle Callahan, Huntington Beach, CA (US)

(72) Inventor: Michelle Callahan, Huntington Beach, CA (US)

( * ) Notice: Subject to any disclaimer, the term of this patent is extended or adjusted under 35 U.S.C. 154(b) by 128 days.

This patent is subject to a terminal disclaimer.

(21) Appl. No.: 18/242,258

(22) Filed: Sep. 5, 2023

(65) Prior Publication Data

US 2023/0403994 A1 Dec. 21, 2023

Related U.S. Application Data

(63) Continuation-in-part of application No. 17/347,423, filed on Jun. 14, 2021, now Pat. No. 11,778,959, which is a continuation of application No. 16/192,658, filed on Nov. 15, 2018, now Pat. No. 11,032,980.

(51) Int. Cl.
| | |
|---|---|
| *A01G 13/20* | (2025.01) |
| *A01G 13/22* | (2025.01) |
| *A01G 13/26* | (2025.01) |
| *A01G 13/37* | (2025.01) |
| *F21Y 115/10* | (2016.01) |

(52) U.S. Cl.
CPC ............ *A01G 13/22* (2025.01); *A01G 13/264* (2025.01); *A01G 13/372* (2025.01); *F21Y 2115/10* (2016.08)

(58) Field of Classification Search
CPC ......... A01G 13/22; A01G 13/21; A01G 13/27
See application file for complete search history.

(56) References Cited

U.S. PATENT DOCUMENTS

| | | | |
|---|---|---|---|
| 9,167,755 B1* | 10/2015 | Kampman | A01G 9/12 |
| 11,277,977 B2* | 3/2022 | Wardlaw | A01G 9/12 |
| 11,291,168 B2* | 4/2022 | Merlock | A01G 13/22 |
| 2004/0216376 A1* | 11/2004 | Missry | A01G 13/22 47/66.6 |
| 2008/0092440 A1* | 4/2008 | Johnson | A01G 27/006 47/66.6 |
| 2010/0107488 A1* | 5/2010 | King | A01G 13/22 47/20.1 |
| 2012/0204488 A1* | 8/2012 | Anderson | A01G 9/12 47/66.6 |
| 2014/0026475 A1* | 1/2014 | Centeno | A01G 13/22 47/29.5 |
| 2014/0196365 A1* | 7/2014 | Washington | A01G 9/124 47/65.5 |
| 2015/0366145 A1* | 12/2015 | Dingwerth | A45B 25/02 47/20.1 |
| 2020/0146223 A1* | 5/2020 | Ahl | A01G 22/05 |

* cited by examiner

Primary Examiner — Monica L Perry
(74) Attorney, Agent, or Firm — David W Barman

(57) ABSTRACT

The present invention is a shade apparatus with central hub and shade components.

4 Claims, 19 Drawing Sheets

SHADE DEVICE

INDEX TO RELATED APPLICATIONS

This application is a continuation in part of U.S. patent application Ser. No. 17/347,423, filed Jun. 14, 2021, which is a continuation of U.S. patent application Ser. No. 16/192,658 filed Nov. 15, 2018, now U.S. Pat. No. 11,032,980, the disclosures of which are incorporated herein by reference in their entirety.

BACKGROUND OF THE INVENTION

The present invention relates to an apparatus to shade plants that are intolerant or in any way sensitive to direct sunlight by using a frame to hold cloth that is elevated above the plants. Many types of plants are unable to be exposed to full sun, or cannot be exposed an entire day to full sun.

People choose to not plant them in ideal locations due to the severity of the sun in that location. There is currently no simple way to shade plants in a useful yet decorative way that doesn't include a large sail of cloth that needs at least 3 anchor points in order to work or a large piece of cloth that is simply laid over the plants. It is also impractical in most cases since finding 3 anchor points isn't always possible. Conventional methods for shading by use of shade cloth has consisted of large "sails" of cloth with grommets or other holding devices set in to the corner in which a user can attach a line of some sort that is then anchored somewhere above the plants or areas wishing to be shaded. This configuration is useless to those that don't have a means to anchor the points of the large sail. They tend to be utilitarian but unattractive and impractical.

Shade cloth also comes in large rolls that are useful for laying over ground plants to shade them while growing. This is useful in the agricultural industry but doesn't translate well to private or residential use. Most people want to see their flowers and plants as they grow. Covering them with a large piece of open weave cloth defeats that purpose.

Accordingly, there exists a need to shade vulnerable plants from the sun that is both attractive and useful. One that is easy to assemble, place and move as needed.

The present invention seeks to solve that problem by providing an attractive, easy to assemble shade cloth holder that can be put into the ground near the plants that need shade. It is self-contained and does not need anchor points. It consists of a frame that holds the cloth, a rod that goes between the frame and the receiving device that is inserted in the ground.

SUMMARY OF THE INVENTION

The subject invention comprises a method and apparatus for protecting plants from the harsh rays of the sun. The invention employs the use of shade cloth that comes in various percentages of sunlight blocked. A frame including two parts that "sandwich" the shade cloth is provided. The frame can be made of any desired material. In one embodiment, it is formed of steel that is powder coated, Aluminum or plastic. The frame has a receiver attached to it that a rod is inserted into. The rod can be nearly any length that allows the shade holder to be above the plants it is used to shade. The other end of the rod fits into a receiver that has been pushed into the ground. The ground receiver is a triangular pointed device made from steel that is reminiscent of a shovel head with a 90 degree bend with the receiver tube for the rod along the inside bend. The ground receiver can be stepped on to insert into the earth.

Additionally, LED lighting can be added that is battery powered. The batteries are recharged by the solar panels included.

1. In one embodiment, the present invention is a shade apparatus comprising:
   a receiver assembly formed of two connected triangular panels having a rod receiver formed thereon;
   a shade assembly formed of a central hub and a plurality of shade petals attached thereto, said hub including a hub support rod receiver;
   a support rod secured in said rod receiver and connected to said hub support rod receiver by a secondary rod attached to said support rod;
   shade material positioned between an upper and lower panel of said shade petal.

In one embodiment, the shade petals are permanently attached to said central hub.

In one embodiment, the shade petals are attached to said central hub and selectively removable.

In one embodiment, the assembly includes LED lights.

In one embodiment, the present invention is a shade apparatus comprising: a receiver supporting a rod support thereon; a shade assembly formed of a support hub and one or more shade members attached thereto; said support hub connected to said rod support; shade material positioned between an upper and lower panel of said shade member.

In one embodiment, the present invention is a shade apparatus consisting of: a receiver supporting a rod support thereon; a shade assembly formed of a support hub and one or more shade members attached thereto; said support hub connected to said rod support; shade material positioned between an upper and lower panel of said shade member.

DETAILED DESCRIPTION OF THE PREFERRED EMBODIMENT

Figure 1:
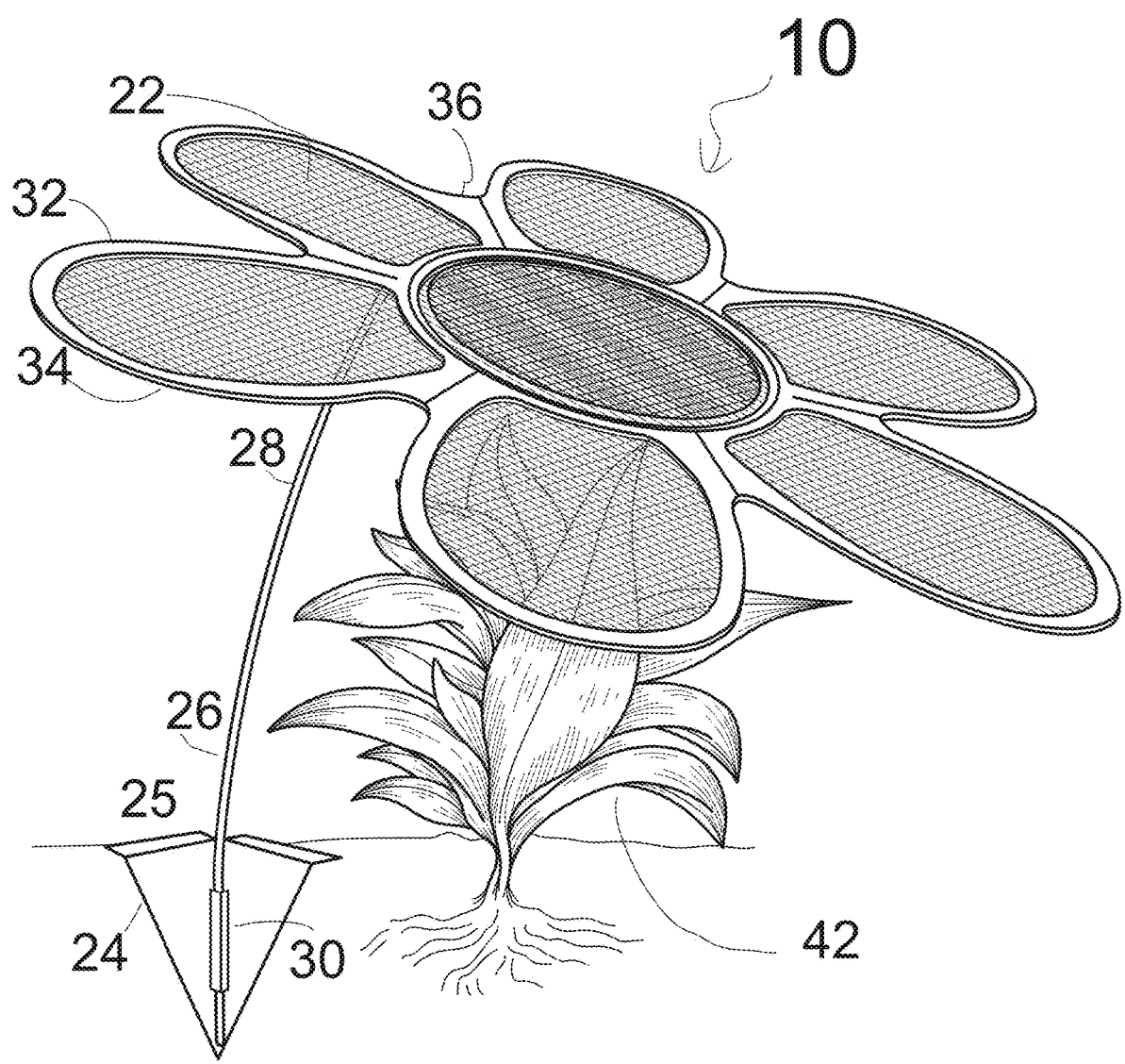
FIG. 1 is a side perspective view according to one embodiment of the present invention.
Figure 2:
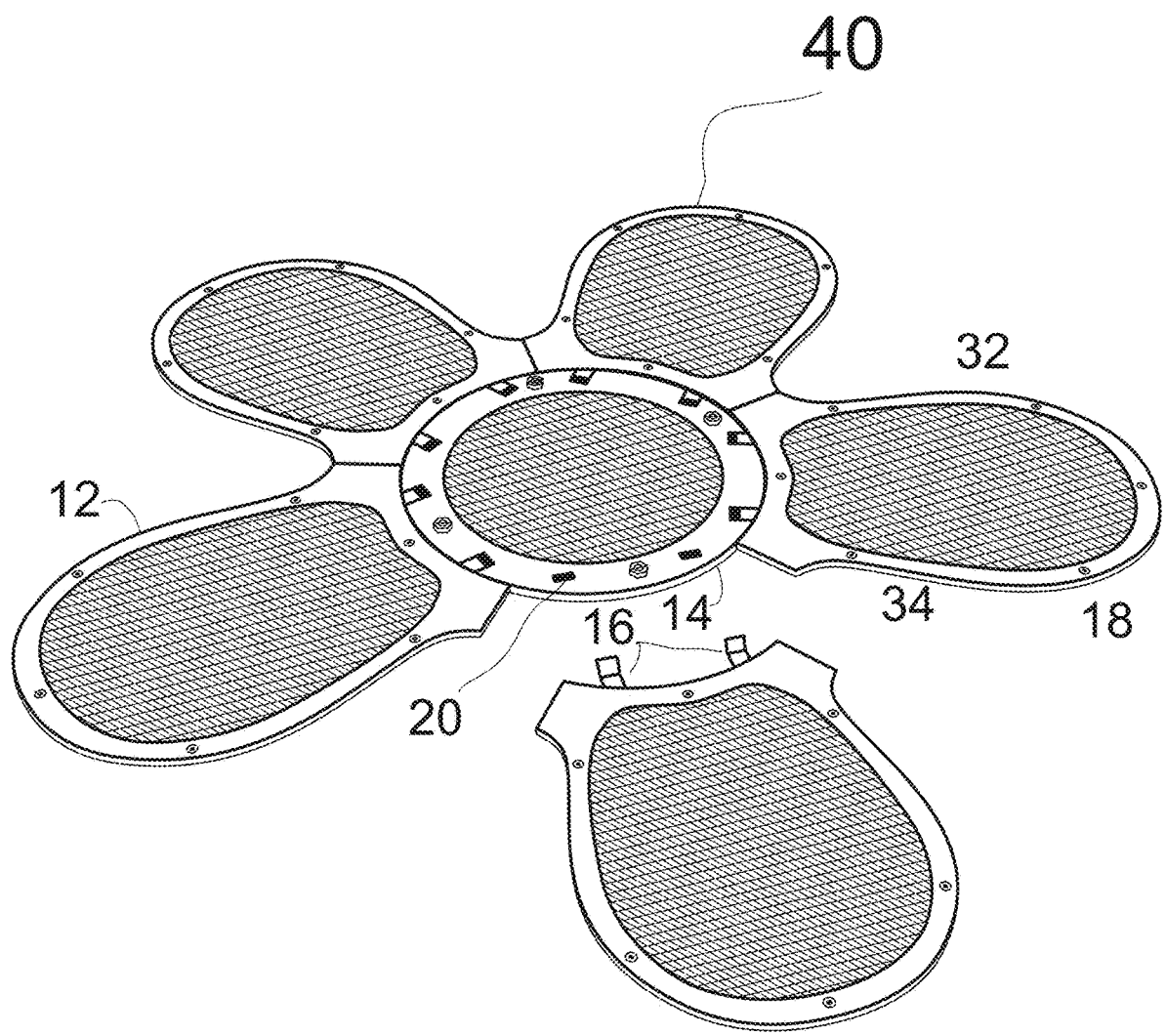
FIG. 2 is a partially separated perspective view of the shade component according to one embodiment of the present invention.
Figure 3:
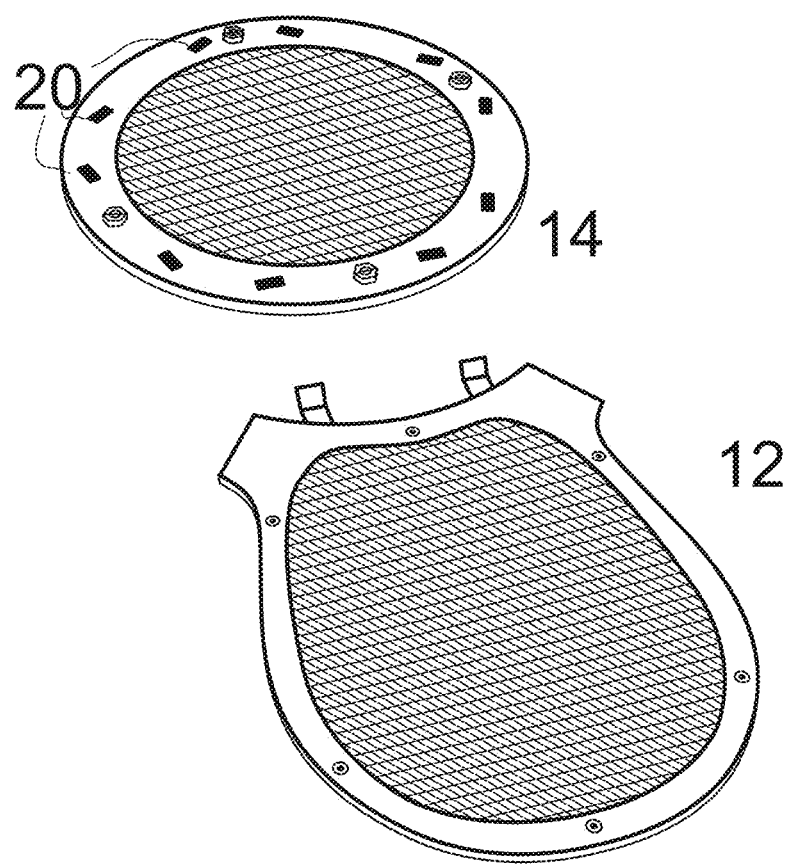
FIG. 3 is a separated view of one element of the shade component according to one embodiment of the present invention.
Figure 4:
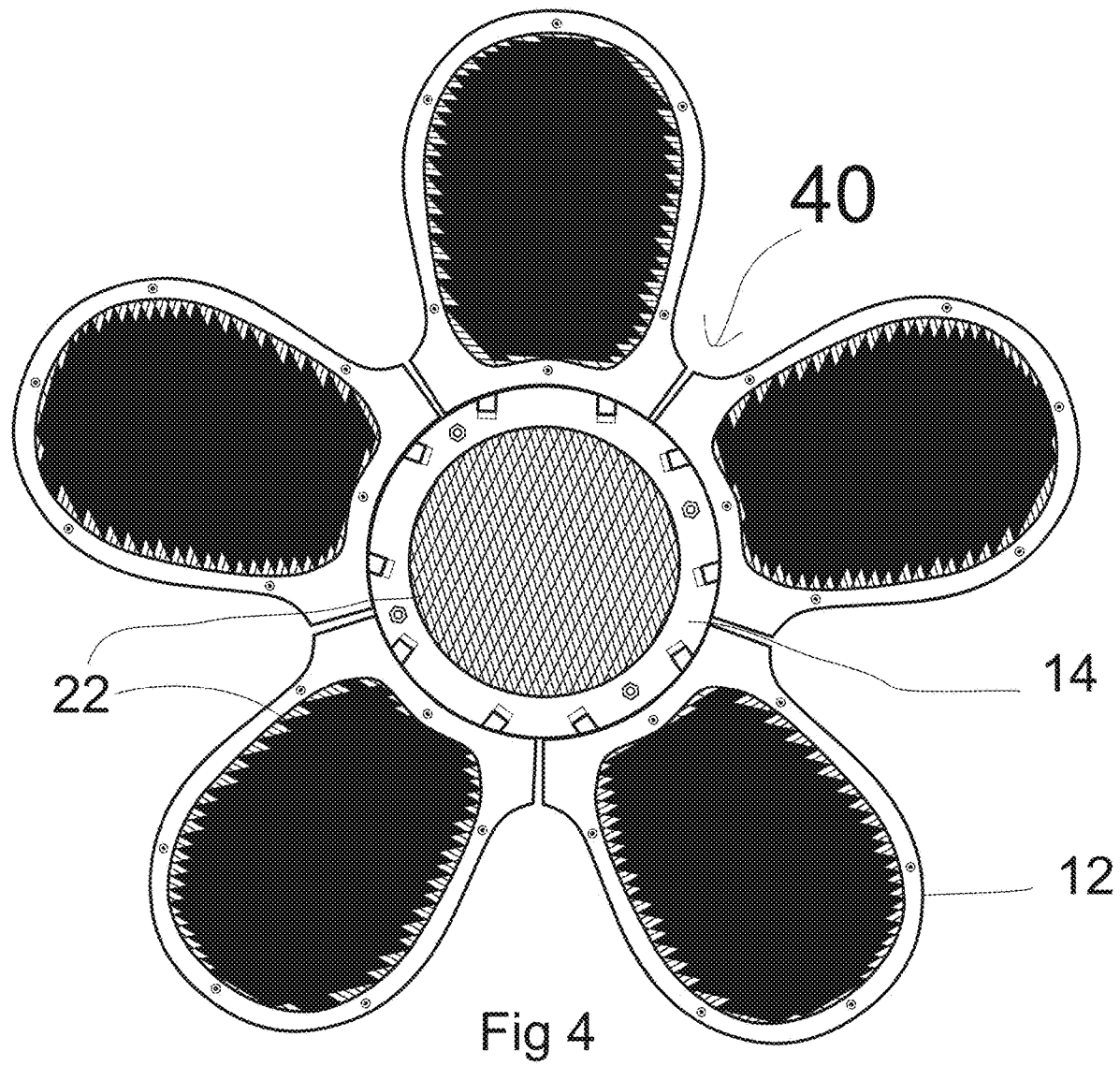
FIG. 4 is a top view of an assembled shade structure according to one embodiment of the present invention.
Figure 5:
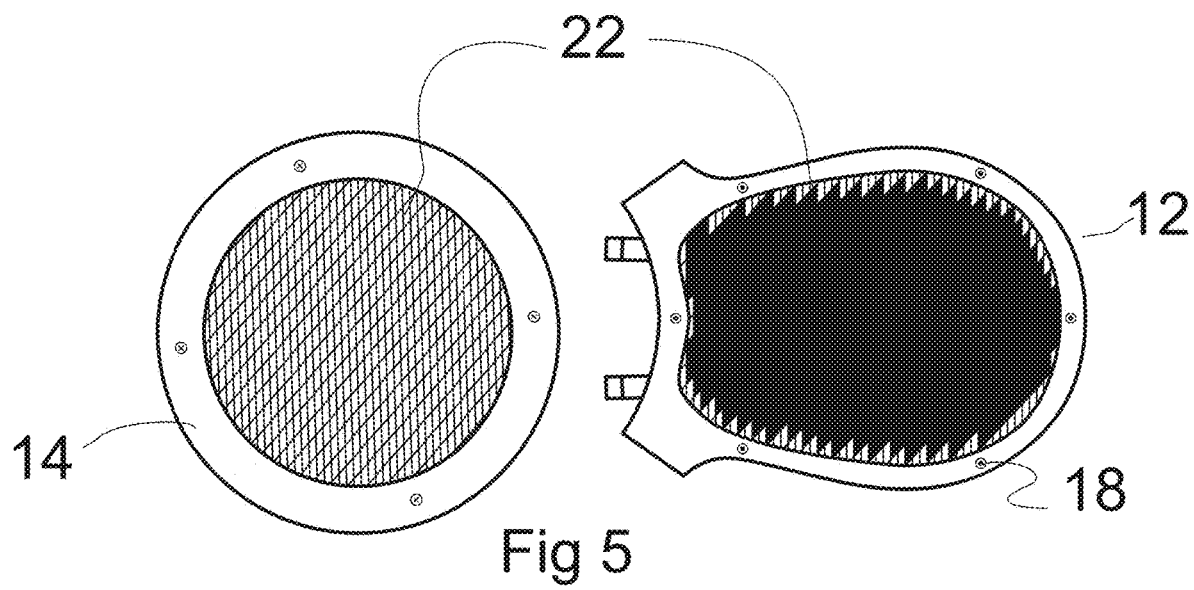
FIG. 5 is a top separated view of a portion of a shade component according to one embodiment of the present invention.
Figure 6:
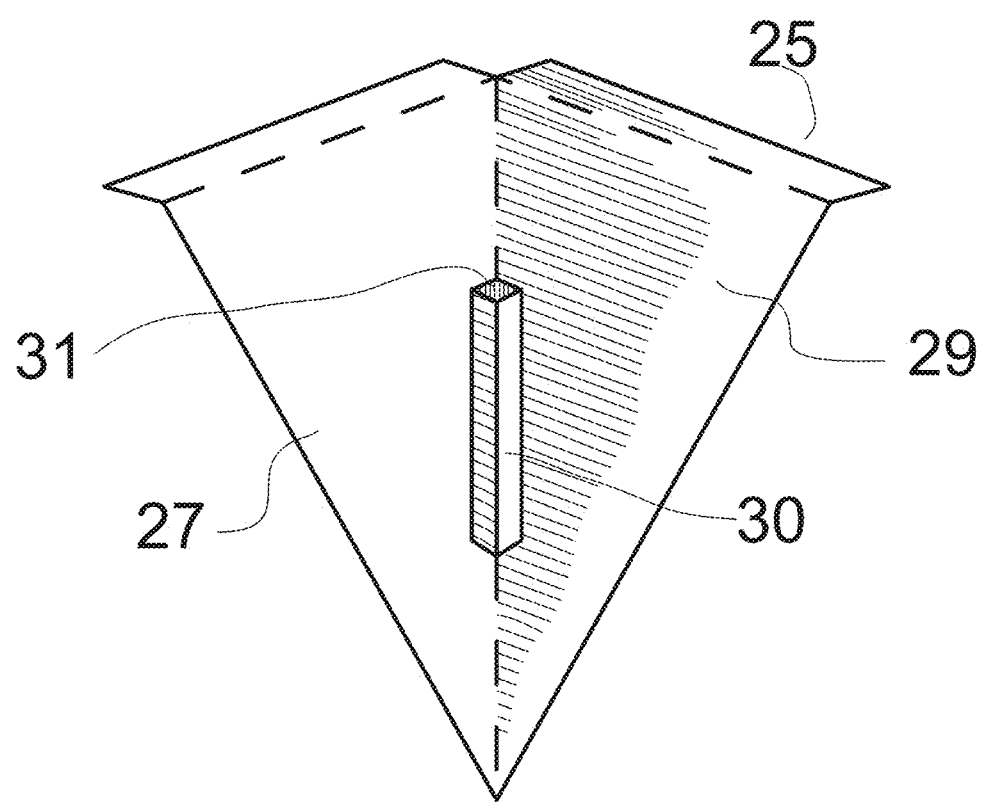
FIG. 6 is a side perspective view of a ground receiver assembly according to one embodiment of the present invention.
Figure 7:
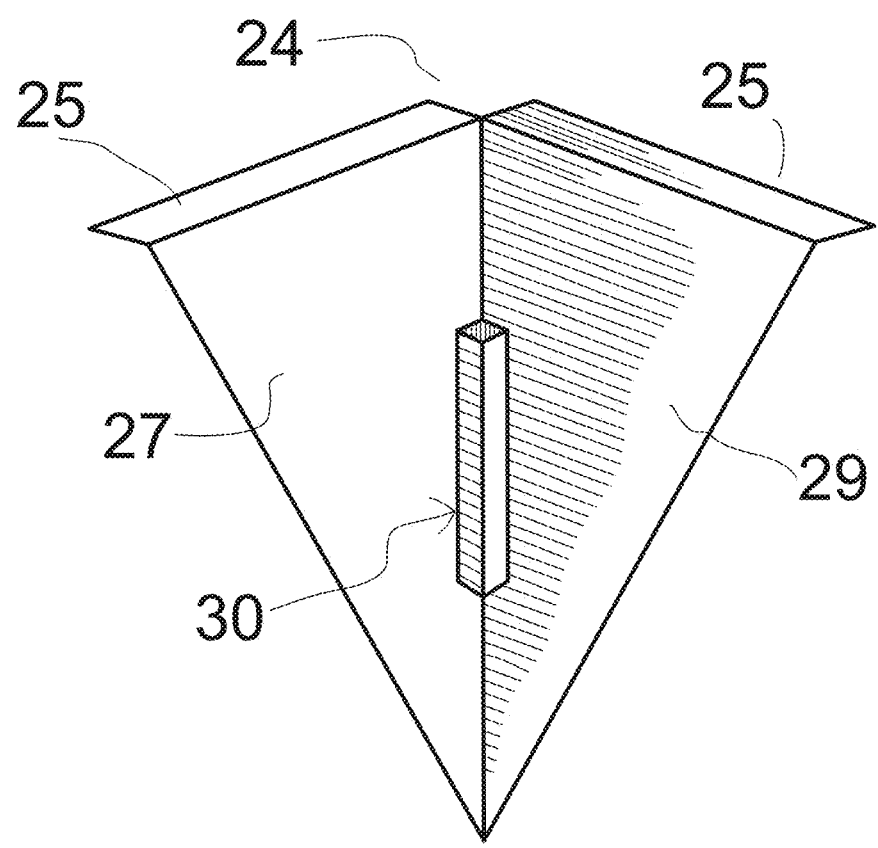
FIG. 7 is a side view of support rod assemblies according to one embodiment of the present invention.
Figure 8:
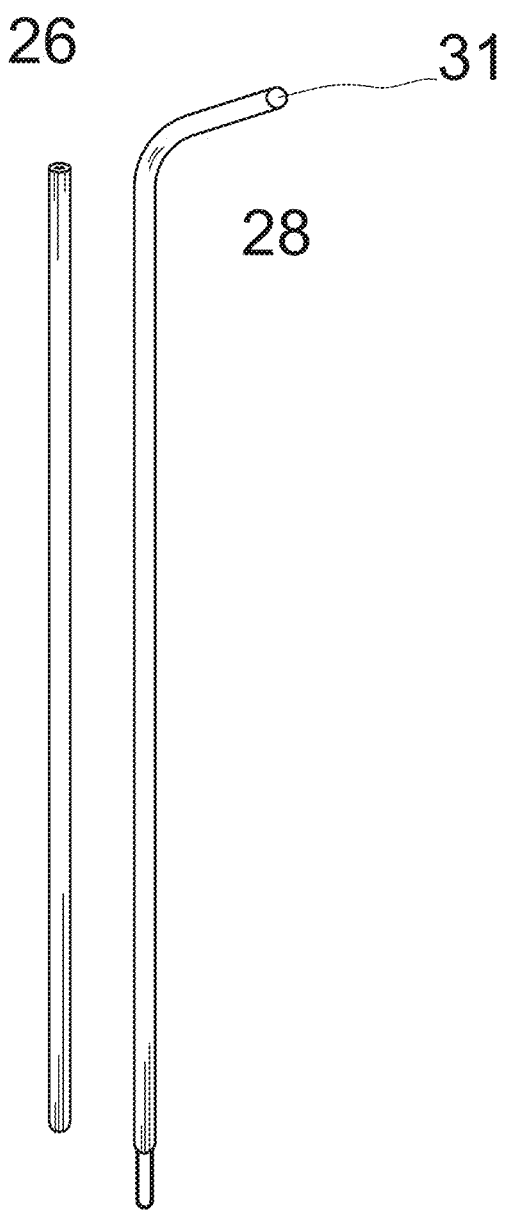
FIG. 8 is a side partial view showing the layers of the shade component according to one embodiment of the present invention.
Figure 9:
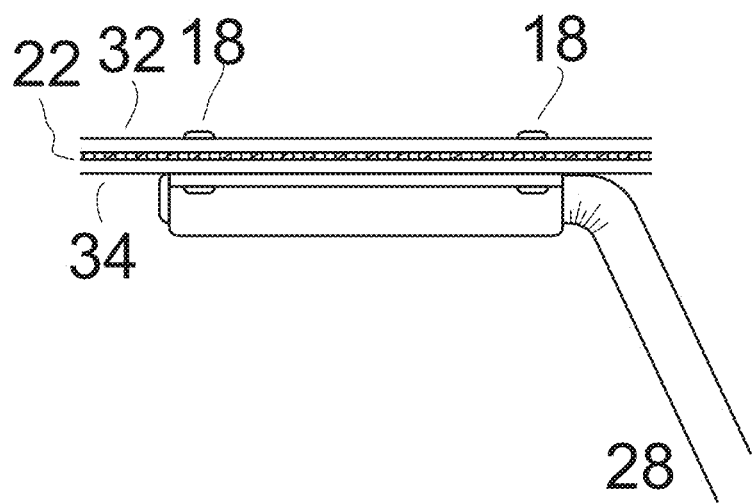
FIG. 9 is a partial side view of the Shade component according to one embodiment of the present invention.
Figure 10:
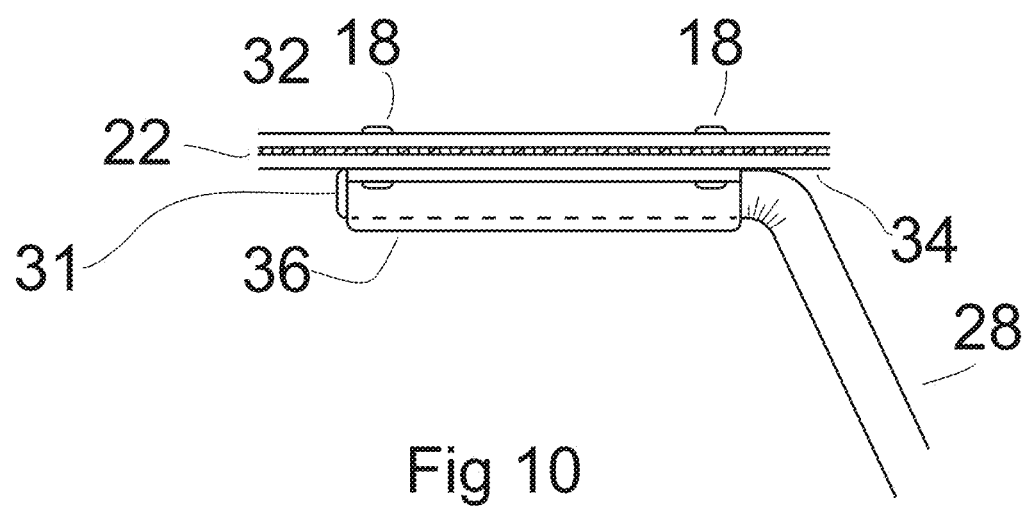
FIG. 10 is a partial front view of a mounted stake component according to one embodiment of the present invention.
Figure 11:
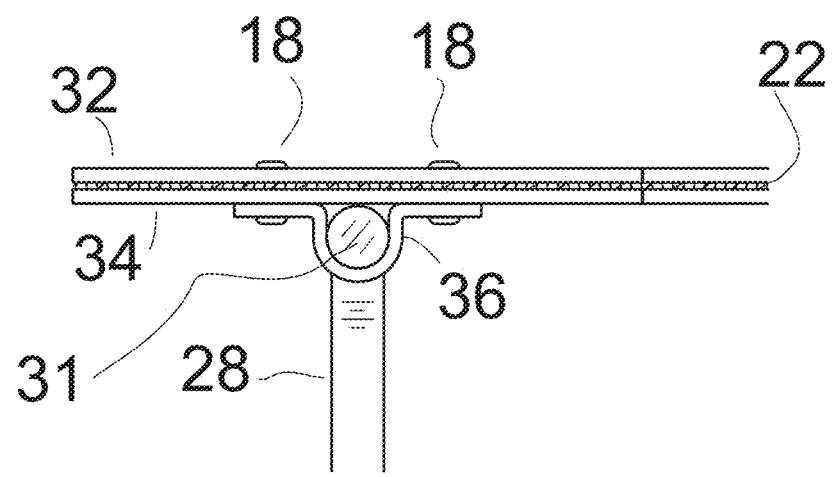
FIG. 11 is a partial front view showing the layers of the shade component and rod receiver.
Figure 12:
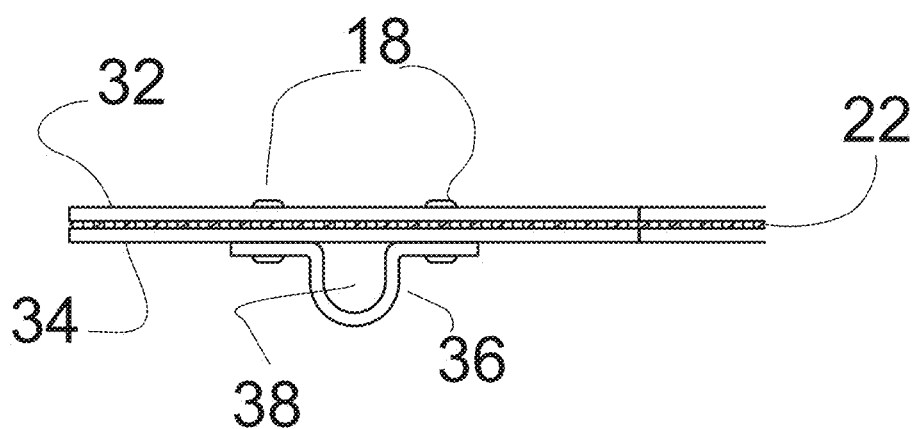
FIG. 12 is a partial side view of the center hub with solar panels for LED lighting
Figure 13:
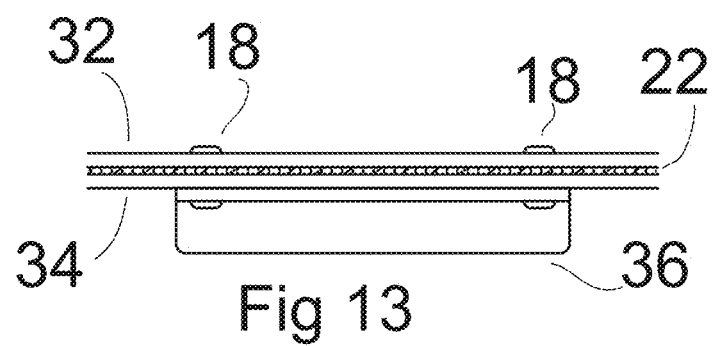
FIG. 13 is a partial view of the center hub with LED lights and batteries.
Figure 14:
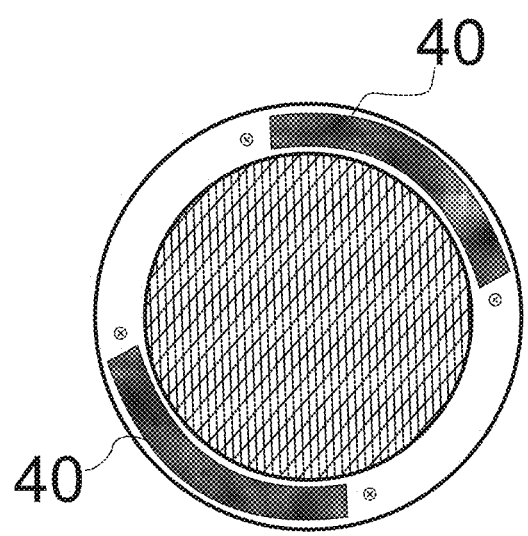
FIG. 14 is a top view of the center hub with solar panels for LED lighting.
Figure 15:
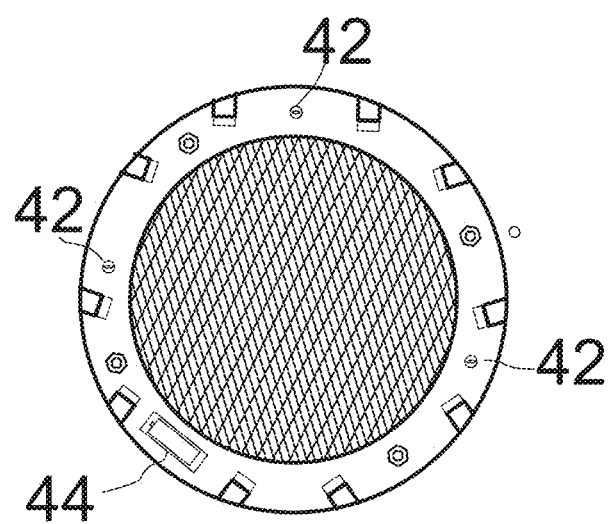
FIG. 15 is a bottom view of the center hub with solar panels for LED lighting.
Figure 16:
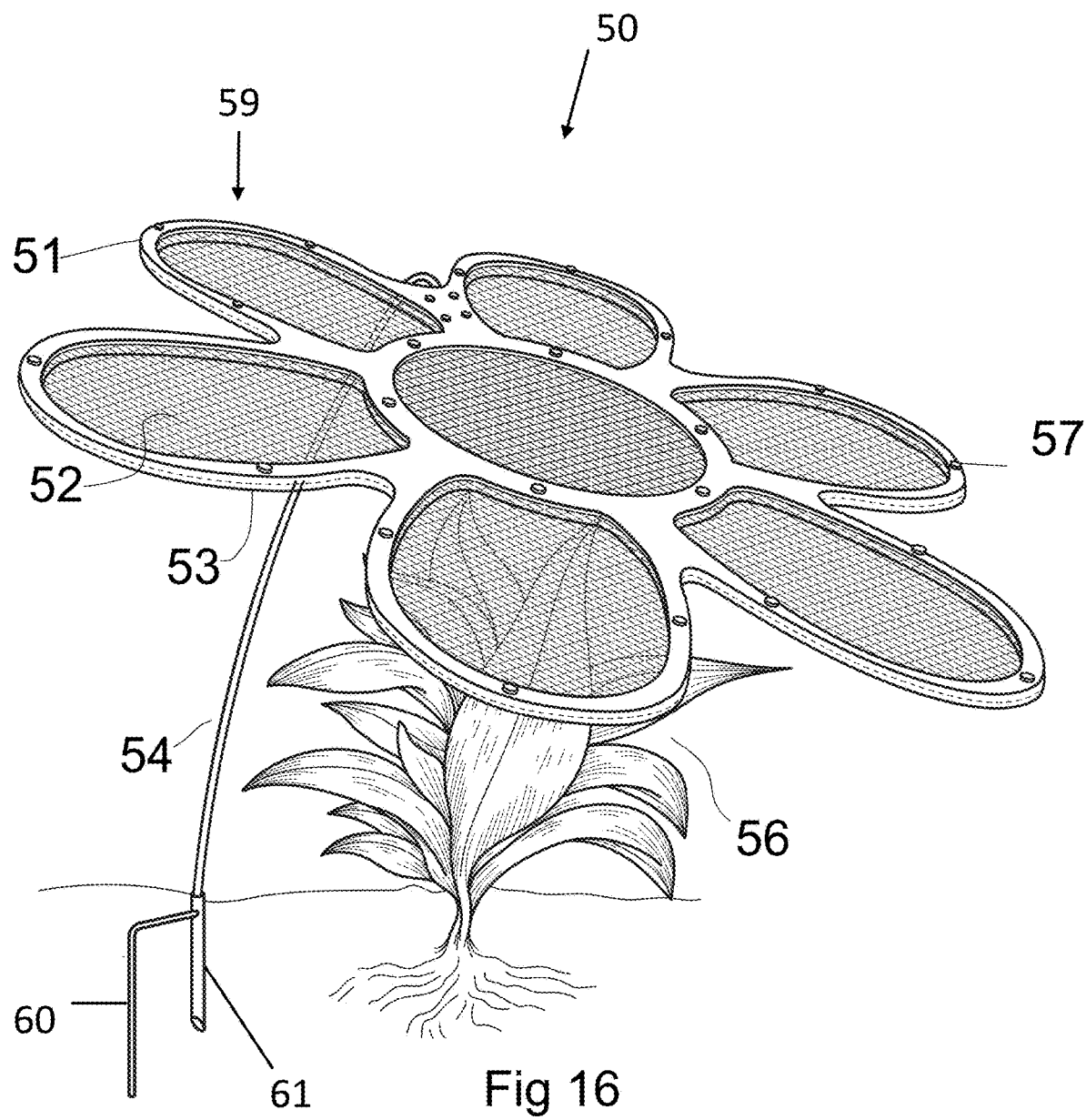
FIG. 16 is a side perspective view according to one embodiment of the present invention.

As generally understood and demonstrated in the drawings, system 10 provides shades to plant 42. Shade assembly 40 includes center hub 14 constructed and arranged to receive a plurality of shade petals 12 whereby male connectors 16 are constructed and arranged to meet with female receivers 20 formed within center hub 14. Each shade petal 12 is constructed and arranged with a top layer 32 a bottom layer 34 with shade cloth 22 positioned there between. Each shade petal 12 is further constructed and arranged with fasteners 18 to secure shade cloth 22 into position. Assembly 10 is secured into position utilizing ground receiver assembly 24 formed with a first panel 27 a second panel 29 and a pair of substantially horizontal supports 25 formed on the upper and terminal end of each of first panel 27 and second panel 29. Rod receiver 30 is positioned at the interface between first panel 27 and second panel 29 and has formed there in receiving cavity 31 constructed and arranged to receive extension rod 26 therein. Secondary extension 28 is constructed and arranged to mate with extension rod 26 and extend the height of shade assembly 40 above plant 42 as desired.

Center hub 14 is further constructed and arranged with Rod receiver 36 mounted on bottom layer 34. 38 formed to receive terminal end 31 of secondary rod 28.

In one embodiment, secondary rod 28 is adjustable along extension rod 26 such that a desired height for assembly 10 is achieved above plant 42.

As generally understood, a user will position ground receiver 24 into a desired location. Each horizontal support 25 is used to urge ground receiver 24 into the ground. Primary support rod 26 is inserted into cavity 30 of ground receiver 24. Shade assembly 40 is attached to secondary extension 28 by inserting terminal end 31 into cavity 38 of rod receiver 36.

In one embodiment, center hub 14 has added solar panels 40 to power LED's 42 with rechargeable batteries 44.

FIGS. 16-19 is generally understood and demonstrated show system 50 provides shade to plant 56. Shade assembly 59 is constructed and arranged with a top layer 51 and a bottom layer 53 with shading cloth 52 positioned there between. Each shade assembly 59 is further constructed and arranged with fasteners 57 to secure shading cloth 52 into position. Assembly 50 is secured into position utilizing ground receiver assembly 55 formed with a stiffener leg 60 secured to primary rod 61. Primary rod 61 is constructed and arranged with a receiving cavity distal to the ground in which support rod 54 is inserted.

Figure 17:
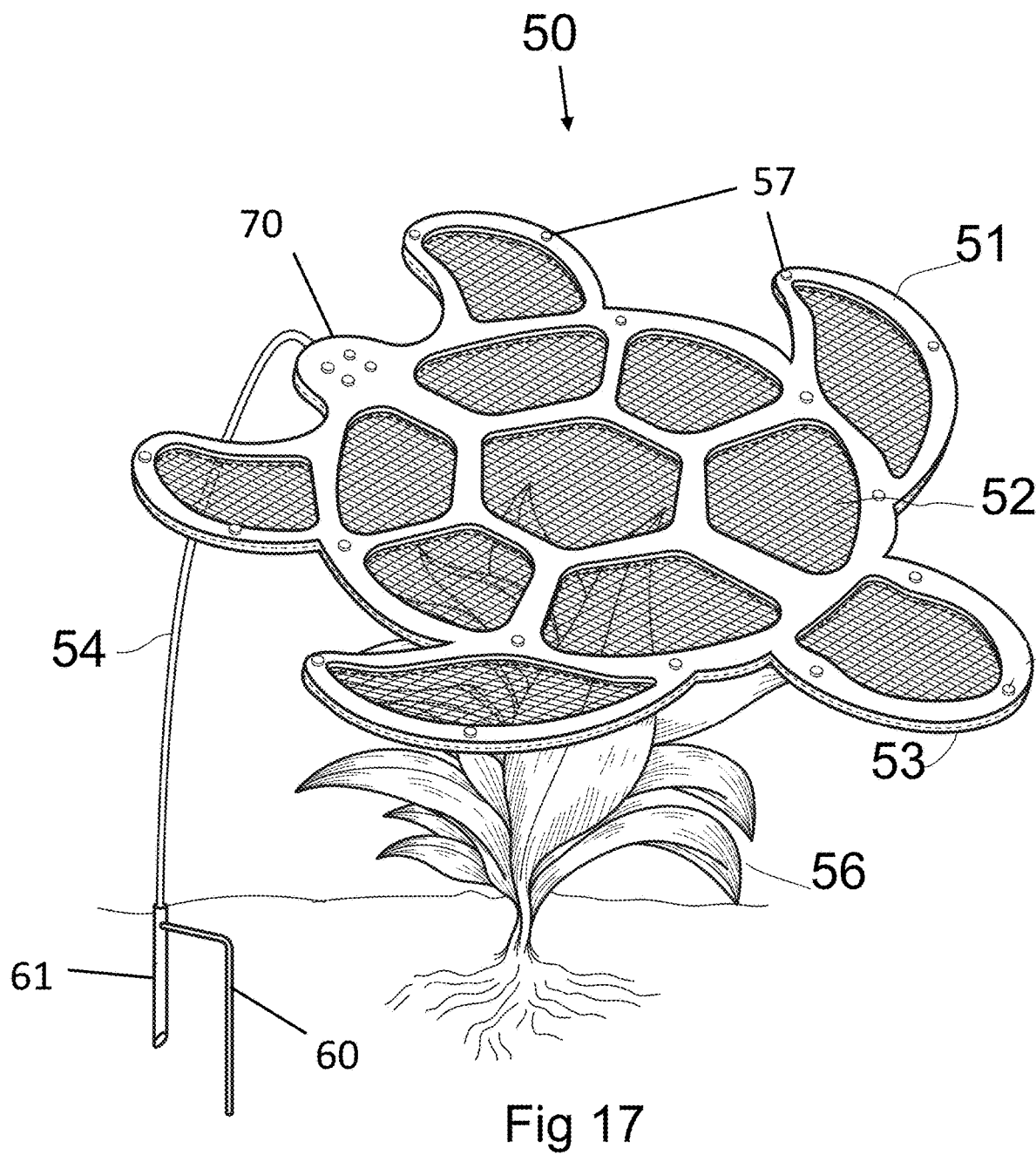
FIG. 17 is a side perspective view according to one embodiment of the present invention.
Figure 18:
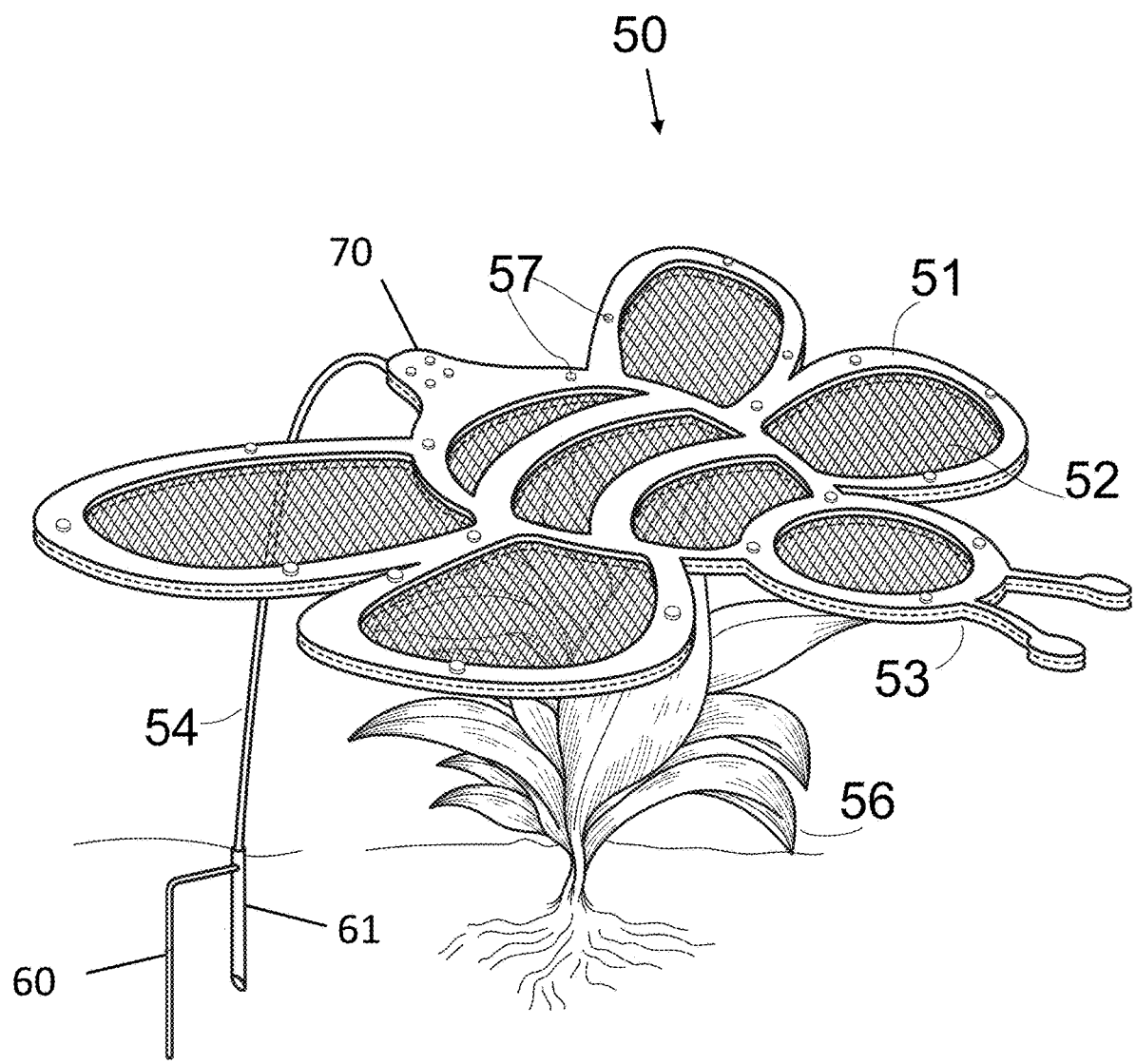
FIG. 18 is a side perspective view according to one embodiment of the present invention.
Figure 19:
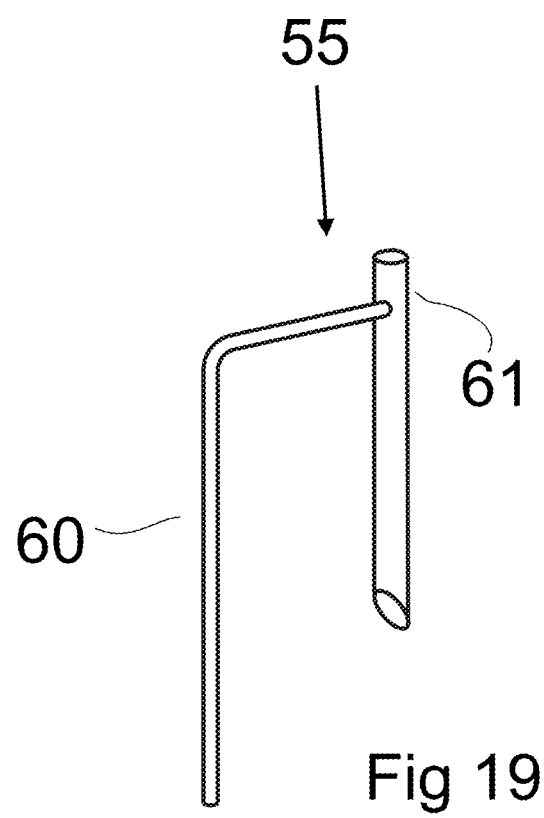
FIG. 19 is a side perspective view of the ground receiver assembly.

Further as understood and demonstrated in FIGS. 17 and 18, shade members are a unitary system 50 with support hub 70 wherein a shade member is the combination system 50 components as shown including all of top layer 51, bottom layer 53 and shade cloth 52.

While the invention has been described in its preferred form or embodiment with some degree of particularity, it is understood that this description has been given only by way of example and that numerous changes in the details of construction, fabrication, and use, including the combination and arrangement of parts, may be made without departing from the spirit and scope of the invention.

What is claimed:

1. A shade apparatus comprising: a receiver supporting a rod support thereon; a shade assembly formed of a support hub and one or more shade members attached thereto; said support hub connected to said rod support; shade material positioned between an upper and lower panel of said shade member.

2. The apparatus of claim 1 wherein said shade members are permanently attached to said support hub.

3. The apparatus of claim 1 wherein said shade members are attached to said support hub and selectively removable.

4. The apparatus of claim 1 wherein said assembly includes LED lights.

* * * * *